(12) United States Patent
Curtis

(10) Patent No.: US 6,695,213 B2
(45) Date of Patent: Feb. 24, 2004

(54) HOLOGRAPHIC CARD FORMATS FOR PRESENTATION AND SECURITY

(75) Inventor: Kevin R. Curtis, Longmont, CO (US)

(73) Assignee: InPhase Technologies, Inc., Longmont, CO (US)

(*) Notice: Subject to any disclaimer, the term of this patent is extended or adjusted under 35 U.S.C. 154(b) by 0 days.

(21) Appl. No.: 09/969,699

(22) Filed: Oct. 2, 2001

(65) Prior Publication Data

US 2003/0010830 A1 Jan. 16, 2003

Related U.S. Application Data

(60) Provisional application No. 60/301,552, filed on Jun. 27, 2001.

(51) Int. Cl.$^7$ ............................................. G06F 19/06
(52) U.S. Cl. ...................................... 235/491; 235/441
(58) Field of Search ................................ 235/454, 441

(56) References Cited

U.S. PATENT DOCUMENTS

| | | | |
|---|---|---|---|
| 5,306,899 A | * 4/1994 | Marom et al. | ............... 235/454 |
| 5,719,691 A | 2/1998 | Curtis et al. | |
| 5,932,045 A | 8/1999 | Campbell et al. | |
| 6,005,691 A | 12/1999 | Grot et al. | |
| 6,103,454 A | 8/2000 | Dhar et al. | |

OTHER PUBLICATIONS

Mok, F. et al. (2000). "Holographic Read–Only Memory" *In Holographic Data Storage*. H. J. Coufal et al., eds., Springer, pp. 399–407.
Redfield, S. (2000). "Tamarack Optical Head Holographic Storage" *In Holographic Data Storage*. H. Coufal et al., eds., Springer, pp. 343–357.
Vacca, J. R. (2001). *Holograms & Holography Design, Techniques & Commercial Applications*. Charles River Media, Inc., Hingham, Massachusetts. (Table of Contents Only).

* cited by examiner

*Primary Examiner*—Harold I. Pitts
(74) *Attorney, Agent, or Firm*—Morrison & Foerster LLP

(57) ABSTRACT

Disclosed is a holographic card for storing data in holographic format in accordance with the present invention includes a holographic layer for containing holographic information and a transparent protective layer overlaying the holographic layer. The holographic layer includes at least a first data section with machine readable holographic data. The card also includes a second data section containing either or both presentation or security data. The second data section is preferably included in the holographic layer, but can also be separate therefrom, particularly when non-holographic data is contained therein.

15 Claims, 2 Drawing Sheets

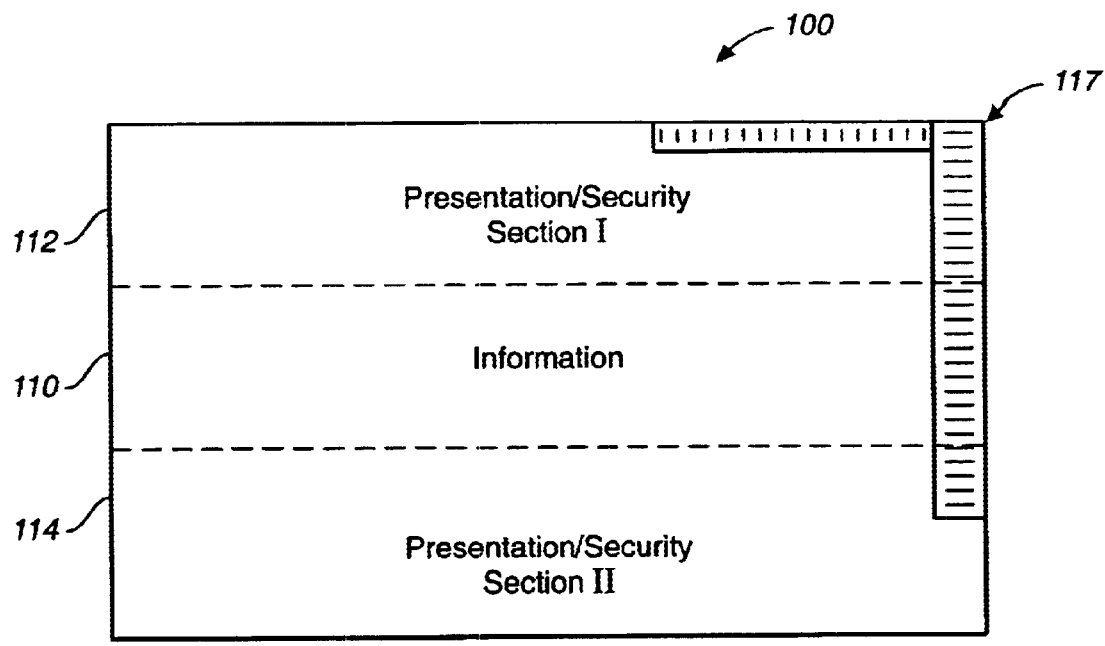
FIG._1
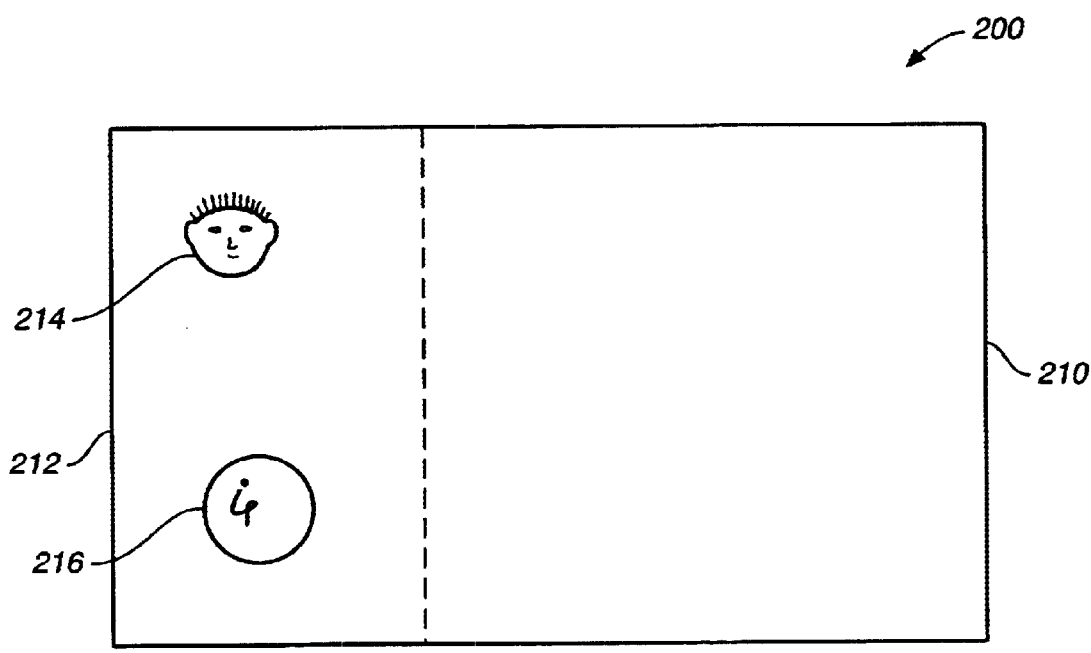
FIG._2

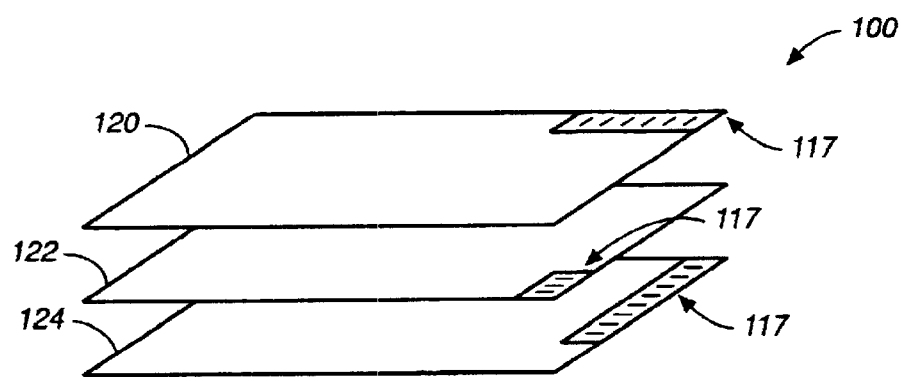
FIG._3
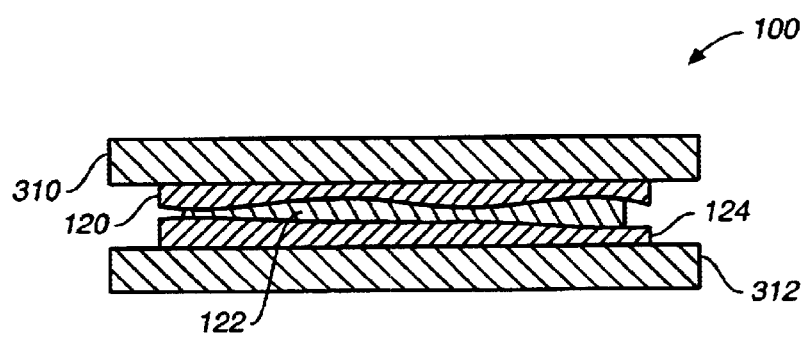
FIG._4
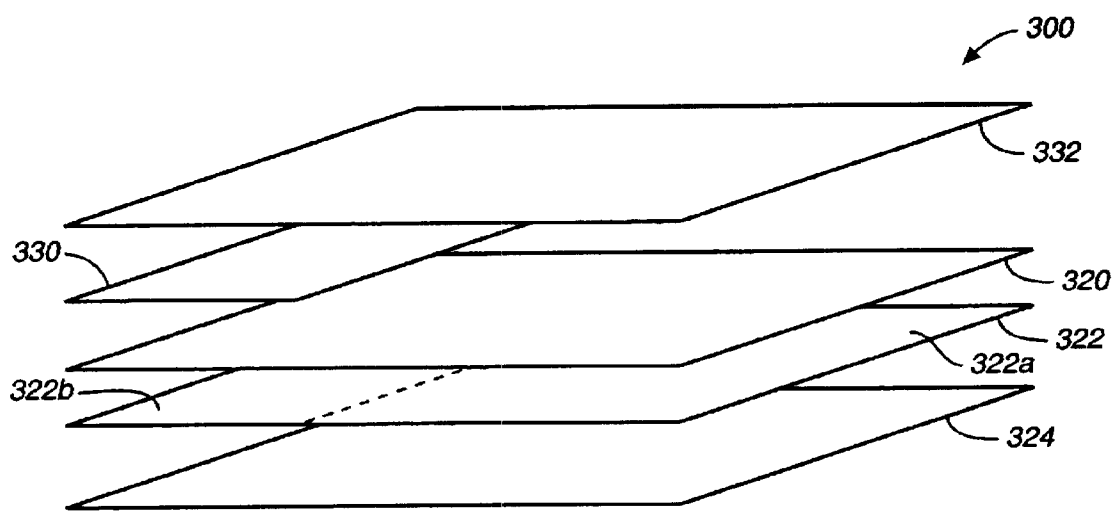
FIG._5

HOLOGRAPHIC CARD FORMATS FOR PRESENTATION AND SECURITY

TECHNICAL FIELD

The present invention relates to storage of data in holographic media. In particular, the present invention relates to storage of holographic data in a card format.

BACKGROUND

Holography is a familiar technology for displaying three dimensional images. Basically, two coherent light beams are caused to intersect in a holographic medium. An interference pattern or grating pattern results that is unique to the two beams and which is written into the medium. This grating pattern is referred to as the hologram and has the property that if it is illuminated by either of the beams used for recording, the illuminating beam diffracts in the direction of the second writing beam. To an observer, it appears as if the source of the second beam is still present at an observation plane.

However, holograms are becoming more common for use in other types of applications such as security and data storage. In data storage applications, as is well understood by those skilled in the art, a page of data is used as a source image and a detector array is placed at the observation plane. Additionally, due to Bragg effects, many holograms may be multiplexed within the same volume of holographic material by slightly changing the angle of the reference beam with each different data page. Large numbers of holograms can be multiplexed this way in a small volume of recording material, providing high data storage potential. A complete discussion of storage holograms can be found, for example, in John R. Vacca, Holograms & Holography Design, Techniques, & Commercial Applications, Charles River Media, Inc., 2001 ("Vacca"). Generally, data stored in holographic media is only machine readable.

With respect to security applications, it is well known to include holograms on credit cards to prevent duplication of these items. A hologram is useful in this context because of the relative difficulty involved in counterfeiting a hologram as compared to printed designs, embossed features and even photographs. However, security holograms used on credit cards are generally embossed only on the surface of the card. As such, while holograms in general are relatively difficult to duplicate, a hologram on the surface of a card can be somewhat easier to duplicate or alter.

One potential solution to the problems associated with relative ease of duplication of surface holograms is offered in U.S. Pat. No. 6,005,691 for "High-Security Machine-Readable Holographic Card" to Grot et al. Grot et al. discloses a hologram card which includes a first plastic material formed to include localized topological features constituting a diffractive optical element. The diffractive optical element is structured to generate a hologram image. The hologram card also includes a protective layer which is chemically bonded to and directly contacts the topological features constituting the diffractive optical element. While the hologram card of Grot et al. includes a protective layer to make any hologram included in the diffractive element more difficult to duplicate, the card includes only a surface hologram, which holds a relatively small amount of information. That is, the hologram card disclosed in Grot et al. is relatively inefficient.

Additionally, while credit cards, and drivers licenses and identification cards, can typically store some information in a magnetic stripe often included with such cards, the amount of information such magnetic stripes can store can be relatively low.

SUMMARY OF THE INVENTION

An apparatus in accordance with the present invention includes a multi-layer holographic card having a section containing holographic machine readable data as well as security and/or presentation information which may be either machine or human readable and may also be holographic. Such a holographic card can advantageously store a relatively large amount of data in holographic format. Further by providing a protective layer over a holographic layer, a holographic card in accordance with the present invention can advantageously provide increased security for data.

In particular, a holographic card for storing data in holographic format in accordance with the present invention includes a holographic layer for containing holographic information and a transparent protective layer overlaying the holographic layer. A typical card is formed by sandwiching the holographic layer between two protective layers or substrates. The holographic layer includes at least a first data section for containing machine readable holographic data. The card also includes a second data section containing either or both presentation or security data. The second data section is preferably included in the holographic layer, but can also be separate therefrom, particularly when non-holographic data is contained therein.

BRIEF DESCRIPTION OF THE DRAWINGS

FIG. 1 is an illustration of an exemplary holographic data card having presentation/security sections and an information section in accordance with the present invention.

FIG. 2 is an illustration of an exemplary holographic data card having photographic or holographic and indicia presentation/security data in accordance with the present invention.

FIG. 3 is an illustration showing a preferred embodiment of the construction of the exemplary holographic data card shown in FIG. 1.

FIG. 4 is an illustration showing a method of making the exemplary holographic data card shown in FIG. 1.

FIG. 5 is an illustration showing a second embodiment of a holographic card having non-holographic security/presentation information not included in a holographic layer in accordance with the present invention.

DETAILED DESCRIPTION

An apparatus in accordance with the present invention includes a multi-layer holographic card having sections for containing holographic machine readable data as well as for containing security and/or presentation information which may be either machine or human readable and may also be holographic. The card is preferably constructed of multiple layers and preferably includes at least a data layer and a protective layer overlaying the data layer. By including the protective layer, information placed in the data layer can not be altered without removing the protective layer, thereby destroying the card. In this way, information placed in the data layer is advantageously more secure than if the protective layer was not provided. Additionally, information placed in the data layer can include volume holograms, allowing many holograms to be multiplexed at the same location. As such, relatively large amounts of data can be stored in the card. Additionally, by including volume holograms, eye-viewable images contained in the card can effectively "float" off the surface of the card due to the higher diffraction efficiencies possible. And, multiplexed correlation patterns can be used to store information that is relatively difficult to replicate. This can advantageously make such a card relatively difficult to counterfeit.

FIG. 1 is a diagram illustrating a holographic card 100 in accordance with the present invention. Card 100 preferably has the approximate width and length of a standard credit card or business card. However, it is also considered that card 100 be smaller (e.g. stamp sized) or larger (e.g. book size). Additionally, while card 100 is in the form of a rectangle, a holographic card in accordance with the present invention can be any shape including, without limitation, a square, circle, triangle or toroid. Card 100 includes three sections; an information section 110, a first presentation/security section 112 and a second presentation/security section 114. Preferably, information section 110, first presentation/security section 112 and second presentation/security section 114 are formed from holographic material such as an acrylate-based photopolymer, a film containing dispersed silver halide particles, or any other suitable holographic medium. As such, as is well understood by those skilled in the art, either pre-recorded digital data or user-recorded digital data can be stored in card 100. Prerecorded information stored in information section 110 could include, without limitation, video, map, medical, financial or other types of machine readable data. As noted in the Background section, storage of such data in holographic format is disclosed, for example, in Vacca.

The presentation/security sections 112 and 114 are preferably reserved for including visible to the eye presentation data or visible to the eye or machine readable security data. Presentation data could include, without limitation, business names, business logos, addresses, voice line and data line numbers and images of the card user. Security data could include, without limitation, custom holographic images, overprinted holographic diffraction foils, or stock holographic images. Such holographic security devices are well known to those skilled in the art and disclosed, for example, in Vacca. Holographic security devices are preferably included in card 100 to deter counterfeiting of card 100. Deterring counterfeiting would be important for applications such as drivers licenses, credit cards, ID cards, or content distribution. While holographic card 100 includes a single information section 110 and two presentation/security sections 112 and 114, it is considered that a holographic card in accordance with the present invention include any number of information sections and presentation/security sections. For example, without limitation, a holographic card in accordance with the present invention may include only a single information section and a single presentation/security section.

Card 100 can also include embossed, pressed, etched or printed servo tracks 117 or servo marks that allow a machine card reader to detect where the data is and to help access the data. Preferably, if servo tracks 117 are etched into card 100, each servo track 117 includes and individual pit having a depth of from $\lambda/5$ to $2\lambda$, where $\lambda$ is the wavelength of the light used to read the servo marks from card 100. As shown in FIG. 1, servo tracks 117 are included in information section 110 and presentation/security sections 112 and 114 in sections extending along two adjacent edges of card 100. However, it is considered that servo tracks be included in just one or two sections of card 100. Servo tracks 117 could also include marks that are not pits. Rather, servo tracks 117 could be light blocking or light reflecting regions on a surface of card 100. In particular, servo tracks 117 could be printed onto a surface of card 100 as alternating on and off bars or dots or as a bar code. Preferably, though not necessarily, servo tracks 117 are located along two edges of card 100 to provide coordinate system (such as an x-y plane) referencing for a machine reader of card 100 or if pits or tracks they would be collocated with the holograms. It is also considered that servo tracks 117 include a printed bar code. Such machine readable servo tracks are well known to those skilled in the art. For example, servo tracks such as servo tracks 117 are used in compact discs (CDs) and digital versatile disks (DVDs) to facilitate reading and writing the data.

FIG. 2 illustrates an exemplary embodiment of a holographic card in accordance with the present invention. As shown, a holographic card 200 includes an information section 210 and a presentation/security section 212. Information section 210 can contain medical data, financial data, or other types of personal or non-personal data. Presentation/security section 212 includes an image 214 which can be an image of the user, or owner, of card 200. Image 214 can be either holographic or photographic and can provide for visual verification of the user of the card. Presentation/security section 212 also includes indicia 216. Indicia 216 can be a security indicia such as a customized hologram which can make card 200 more difficult to counterfeit. For example, if information section 210 of card 200 contained financial information, allowing card 200 to be used as a credit card, indicia 216 could be a logo of the company issuing the credit card. Creation of such holographic (and non-holographic) logos is well known to those skilled in the art.

FIG. 3 illustrates a preferred embodiment for the structure of a holographic card in accordance with the present invention such as card 100. As shown, holographic card 100 preferably includes three layers; a protective layer 120, a substrate layer 124 and a holographic material layer 122 sandwiched there-between.

Protective layer 120 is preferably translucent and more preferably transparent to allow data contained in the holographic material layer 122 to be viewable by eye. By providing transparent protective layer 120 over holographic material layer 122, the eye viewable information contained in presentation/security sections 112 and 114 of card 100 cannot be altered without removing protective layer 120. Preferably, as discussed further below, removal of protective layer 120 would either destroy card 100 or at least make it obvious that card 100 had been tampered with. As such, unlike cards having surface embossed holograms, altering presentation and security information in card 100 is advantageously made more difficult due to the volume holographic nature of the media.

Substrate layer 124 is for adding additional structural support to card 100. Additionally, substrate layer 124 serves to protect holographic material layer 122. Substrate layer 124 can be either transparent, reflective, or opaque. Though substrate layer 124 adds structural support to card 100 and provides additional protection for holographic material layer 122, it is within the ambit of the present invention not to include substrate layer 124 in construction of a holographic card in accordance with the present invention. Specifically, it is considered to construct card 100 with just holographic material layer 122 and protective layer 120.

FIG. 3 also shows servo tracks 117, discussed above with respect to FIG. 1, located along an edge of holographic material layer 122 and substrate layer 124. Additionally servo tracks 117 are located along an edge of protective layer 120. However, servo tracks 117 can be included in any one alone of, or any combination of, protective layer 120, holographic material layer 122 and/or substrate layer 124.

As noted above, holographic material layer 122 preferably contains holographic presentation/security data in presentation/security sections 112 and 114 and holographic information data in information section 110. Information data in information section 110 of holographic material layer 122 is preferably machine readable holographic data. Information data can be holographic multiplexed data multiplexed in any manner including, without limitation, angle, fractal, wavelength, shift, correlation and spatial multiplexing. These methods of multiplexing holographic data are well know to those skilled in the art. Presentation/security data can also be multiplexed into card 100.

A method of phase correlation multiplexing is disclosed, for example, in U.S. Pat. No. 5,719,691 to Curtis et al. entitled "Phase Correlation Multiplex Holography" which is hereby incorporated herein in its entirety by reference. In one embodiment of phase correlation multiplex holography, a reference light beam is passed through a phase mask, and intersected in the recording medium with a signal beam that has passed through an array representing data, thereby forming a hologram in the medium. The spatial relation of the phase mask and the reference beam is adjusted for each successive page of data, thereby modulation the phase of the reference beam and allowing the data to be stored at overlapping areas in the medium. The data is later reconstructed by passing a reference beam through the original storage location with the same phase modulation used during data storage.

Data recorded in information section 110 is preferably, though not necessarily, recorded in holographic material layer 122 after forming card 110. For example, in an application where holographic card 100 is provided to an end user through sale or otherwise, the end user can record information in information section 110 and/or presentation/security sections 112 and 114 after purchasing a holographic card such as card 100. Examples of reader/recorders which can be used by user in such a circumstance is disclosed, for example, in H. J. Coulfal et. al, Holographic Data Storage C. Springer-Verlag 2000, pp. 343–357 and 399–407, which is hereby incorporated by reference herein in its entirety. As discussed in Coulfal, such reader/recorders can also be used to read holographic data already stored in card 100. It is also considered to record all or additional information in the information section 110 before holographic material layer 122 has been laminated between substrate layer 124 and protective layer 120.

Data in presentation/security sections 112 and 114 is also preferably contained in the volume of holographic material layer 122. As discussed above, security data in presentation/security sections 112 and 114 is preferably holographic data and can include, without limitation, images of the user; fingerprint, voice or other user biometric data; and/or holographic patterns to make card 100 difficult to copy. Presentation data in presentation/security section 112 and 114 can include, without limitation, a company name, company logo, user name, and user contact information. Some or all of this information can also be included in holographic material layer 122 in non-holographic form. For example, without limitation, a company logo or user contact information could be included in non-holographic form while other presentation/security information could be included in holographic form.

As used herein, a volume hologram in card 100 indicates that an index of refraction change exists in the volume of the holographic material layer as opposed to existing merely at the surface of the holographic layer, as disclosed in Grot et al. discussed in the background section. Volume holographic data stored in holographic material layer 122 can have a higher refractive efficiency than holograms placed on the surface of a card (such as surface relief or embossed holograms) That is, a surface relief hologram typically can refract only up to about 10% of the light incident on the hologram. However, a hologram in a translucent holographic material in card 100 can refract up to 100% of the light incident thereon. As such, a hologram of card 100 can be relatively more visible and brighter to the eye that a surface hologram. Additionally, the images may be two dimensional or three dimensional holograms and more images can be recorded in holographic material layer 122 than in a surface hologram. For example, it is possible to multiplex 20–50 holograms with 100% efficiency each in a volume material while multiplexing that many in a surface relief fashion would typically result in efficiencies of approximately $10^{-4}$ (that is, 0.01% of the light incident on the multiplexed surface relief holograms would be refracted). This would result in a hologram which would be relatively difficult to view. Recording of holograms in a holographic material such as holographic material layer 122 is well known to those skilled in the art and discussed, for example, in Vacca. Additionally, presentation/security data could be single or multiplexed holograms. If holograms are multiplexed correlation patterns, the data would be relatively difficult to reproduce. Specifically, as discussed in Curtis et al., using phase correlation to store an image requires highly precise matching of recording conditions to detect the image signal. As such, recording such correlation patterns can facilitate verification of card authenticity.

A method of making a holographic card having multiple layers in accordance with the present invention is disclosed in U.S. Pat. No. 5,932,045 entitled "Method for Fabricating a Multilayer Optical Article" issued to Campbell et al. on Aug. 3, 1999 ("Campbell") which is hereby incorporated by reference herein in its entirety. FIG. 4 is partially reproduced from Campbell and will be referred to in a brief discussion of the fabrication method. To make card 100, protective layer 120 and substrate layer 124 are affixed to first holder 310 and second holder 312, respectively, by vacuum, electrostatic force, magnetic attraction or otherwise. Preferably, first and second holders 310 and 312 were previously placed in a parallel relationship with one another. Holographic material layer 122, still in a viscous form, is then placed between protective layer 120 and substrate layer 124 and is used as the adherent to hold protective layer 120 and substrate layer 124 together. The holders 310 and 312 press substrate layer 124 and protective layer 120 together with enough force to obtain a desired spread of holographic material layer 122. Holographic material layer 122 is then cured.

It is possible for the adherent to be photocurable or otherwise curable, e.g., radiation or chemical curable. Heat may be used to accelerate a radiation cure. When using the above method, it is preferable for the adherent to be a material that undergoes a phase transformation, e.g., liquid to solid, to attain a required adherence. As used herein, the terms cure and curable are intended to encompass materials that gel or solidify by any such methods. Photocurable adherents include materials that cure upon exposure to any of a variety of wavelengths, including visible light, UV light, and x-rays. It is also possible to use adherents that are curable by electron or particle beams. Useful adherents include photocurable adherents that are photosensitive, the term photosensitive meaning a material that changes its physical and/or chemical characteristics in response to exposure to a light source (e.g., selective, localized exposure). Such photosensitive adherents include but are not limited to certain photosensitized acrylates and vinyl monomers. Photosensitive adherents are useful because they act as both an adherent and a recording media.

It is possible for the adherent to comprise additives such as adherence-promoters, photoinitiators, absorptive materials, or polarizers. The thickness of the post-cure adherent will vary depending on several factors, including the adherent used, the method of application, the amount of adherent applied, and force exerted on the adherent by the substrates. Different thickness will be desired for different applications. Preferably, however, the holographic material layer 122 is a volume layer with a thickness of 5 microns to 6 mm. The level of cure needed is determined by the particular adherent used and by the force required to maintain a substrate or multilayer article with the encased optical article in the position imparted by the holder or holders. For materials that are photocurable, heat curable, or chemically curable, it is possible for suitable cures to range from a few percent to 100%.

Additionally, in the method described above, holographic material layer 122 could be formed by mixing a matrix precursor and a photoactive monomer. Such a holographic medium is disclosed in U.S. Pat. No. 6,103,454 which is hereby incorporated in its entirety by reference. One advantage of using this type of media is that the card can be made to have relatively good transmitted wavefront quality (that is, the card looks optically flat). Specifically, using the method and media discussed above, a holographic card in accordance with the present invention, such as card 100, can easily be made to have a transmitted optical flatness which exceeds $\lambda/2$ per centimeter squared at a wavelength of 780 nm measured interfermetrically. Transmitted optical flatness is a measure of the deviation, from a predetermined profile, of an optical path length through an optical article. Such a measure is well known to those skilled in the art and discussed, for example, in Campbell et al., which has been incorporated by reference. Such optical flatness can advantageously make card 100 relatively high performance and relatively simple. In particular, holograms can be recorded in holographic material layer 122 at a relatively high density and at a relatively high signal to noise ratio. Additionally, data can be transferred both to and from a holographic card having the cited flatness at relatively high transfer rates. The above described method of fabricating a holographic card in accordance with the present invention can also reduce wedge (increasing or decreasing thickness in a direction parallel to the surface of the card). By these methods the wedge of the entire card can be made to be less than a 20 wavelengths as measured interferometrically at 780 nm. That is, the thickness over the entire surface of the card will not vary more that 20 wavelengths when measured using a 780 mn light beam. Such a measure is well known to those skilled in the art and discussed, for example, in Campbell et al., which has been incorporated by reference.

Another medium from which holographic material layer 122 may be fabricated can be a member of a class described and claimed in U.S. Pat. No. 5,719,691 to Colvin et al. for a "Photo Recording Medium" which is hereby incorporated by reference herein in its entirety. Briefly, it is an all-acrylate composition constituted of an oligomeric matrix and dispersed monomer, which together, under the influence of a photoinitiator, respond to illumination by local polymerization to increase refractive index. The specific composition is:

| Component | Percent by Weight |
|---|---|
| isobornyl acrylate | 37.23 |
| oligomeric urethane acrylate | 55.84 |
| photoinitiator | 5.96 |
| tertiary butyl hydroperoxide | 0.97 |

However, the medium of holographic material layer 122 could also be any acrylate-based photopolymer, or other suitable holographic medium such as, without limitation, a film containing dispersed silver halide particles or a free-standing LiNbO3 crystal. As discussed above, exposing holographic storage or presentation/security data into holographic material layer 122 is well understood by those skilled in the art.

As noted above, holographic data can be stored in holographic card 100, in either the security/presentation sections 112, 114 and/or information section 110, by the manufacturer thereof after fabrication of the card. Additionally, a user to whom a holographic card such as holographic card 100 may be sold after fabrication can also store holographic information in either the security/presentation sections 112, 114 and/or information section 110. As noted above, it is also contemplated that holographic material be stored in holographic layer 122 prior to fabrication of card 100. In such a case, the holographic medium would have to have structural rigidity prior to fabrication of card 100. Such a material is described in Colvin et al. which has been incorporated by reference.

Protective layer 120 and substrate layer 124 can be fabricated from either the same or different materials. The materials from which protective layer 120 and substrate layer 124 can be formed include, without limitation, ceramics (including glasses), silicon, metals, polycarbonate, polymethylmethacrylate, or acrylic, or plastics. In addition to self supporting substrates such as glass plates, it is possible for the substrate to be a polymeric material that is sprayed onto a holder, a thin polymer film such as Mylar®, or a polymer sheet such as polycarbonate. It is also considered that a polymeric material or film be combined with a self supporting material such as a glass plate to form a single substrate. Either or both protective layer 120 and substrate layer 124 may be an optical article such as, with limitation, a polarizer, half or quarter wave plate, neutral density filter, birefrengement plate, or diffractive optic.

It is also considered that some presentation/security information be included on the surface of protective layer 120 as in a standard business card or credit card. For example, presentation information such as a card user's name, corporation name, and contact information could be included on the surface of card 100 while additional presentation/security information, such as a company logo, be included in holographic material layer 122. FIG. 3 is an illustration showing the construction of a holographic card 300 having presentation/security information on the surface of protective layer 320. Like holographic card 100 illustrated in FIGS. 1 and 3, holographic card 300 includes a substrate layer 324, a holographic medium layer 322 and a protective layer 320 which can be substantially the same as substrate layer 124, holographic material layer 122 and protective layer 120 of holographic card 100. Holographic card 300 preferably also includes a non-holographic layer 330 and laminating layer 332. Non-holographic layer 330 preferably contains non-holographic data which could include presentation/security information as discussed above. Non-holographic layer 330 is preferably adhered to protective layer 320 as is well understood by those skilled in the art. A laminating layer 322 is preferably placed over non-holographic layer 330 to protect non-holographic layer 330. Preferably, holographic medium layer 322 includes an information section 322a which is offset from non-holographic data layer 330 so that non-holographic data layer 330 does not obscure information section 322a. Rather, a separate presentation/security section 322b is reserved in holographic medium layer 322 over which non-holographic layer 330 is located. It is also considered that non-holographic layer 330 be a part of protective layer 320 and that laminating layer 332 not be included in card 300.

Laminating layer is preferably translucent and can be made from the same material as protective layer 320 discussed above. Non-holographic layer 330 can be fabricated from any suitable material depending upon the nature of the non-holographic data contained therein. For example, without limitation, if non-holographic layer 330 is a photograph, the fabrication material would be a photographic or printed paper or emulsion. If non-holographic layer 330 is text data or a printed symbol, the fabrication material could be printed paper or plastic.

Card 300 can be manufactured in substantially the same way as card 100 discussed above. In particular, substrate layer 324, holographic media layer 322 and protective layer 320 can be laminated as described above. Then, non-holographic layer 330 can be placed on or in protective layer 320 as is well understood by those skilled in the art and laminating layer 332 can be placed thereover, as is also well understood by those skilled in the art.

The security and presentation holograms could be recorded or mastered at time of the card fabrication or the user could use the corresponding card writer to recorded user specific holograms into these areas of the card. These user recorded holograms could be either machine readable or visible to the eye.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many other variations are also to be considered within the scope of the present invention.

What is claimed is:

1. A holographic card for storing data in holographic format including:

a holographic layer for containing holographic information having at least a first data section with machine readable volume holographic data;

a transparent protective layer overlaying the holographic layer; and a second data section containing at least one of either presentation and security data.

2. The holographic card of claim 1 wherein the second data section is contained within the holographic layer.

3. The holographic card of claim 2 wherein the at least one of either presentation and security data include machine readable holographic data.

4. The holographic card of claim 3 wherein the at least one of either presentation and security data include eye viewable holographic data.

5. The holographic card of claim 4 further including a substrate layer overlaying the holographic layer and for providing support and protection for the holographic layer.

6. The holographic card of claim 1 wherein at least one of either presentation and security data are included at the surface of the protective layer.

7. The holographic card of claim 6 further including a laminating layer overlaying the protective layer.

8. The holographic card of claim 1 wherein the holographic data in the holographic layer includes multiplexed holographic data.

9. The holographic card of claim 1 where the holographic layer is at least 5 microns thick.

10. The holographic card of claim 1 where the transmitted optical flatness is less than one wavelength per cm squared measured at 780 nm.

11. The holographic card of claim 1 where the transmitted wedge of the entire card is less than 20 wavelengths measured at 780 nm.

12. The holographic card of claim 1 where the holographic layer is a photopolymer.

13. The holographic card of claim 6 further including servo marks fabricated into at least one of either the protective and substrate layers of the holographic card.

14. The holographic card of claim 1 wherein at least one correlation pattern is recorded in the holographic layer to verify authenticity of the holographic card.

15. The holographic card of claim 1 wherein the at least one of either the presentation or the security data is multiplexed in the holographic layer after the card is sold to a user.

* * * * *